No. 793,206. Patented June 27, 1905.

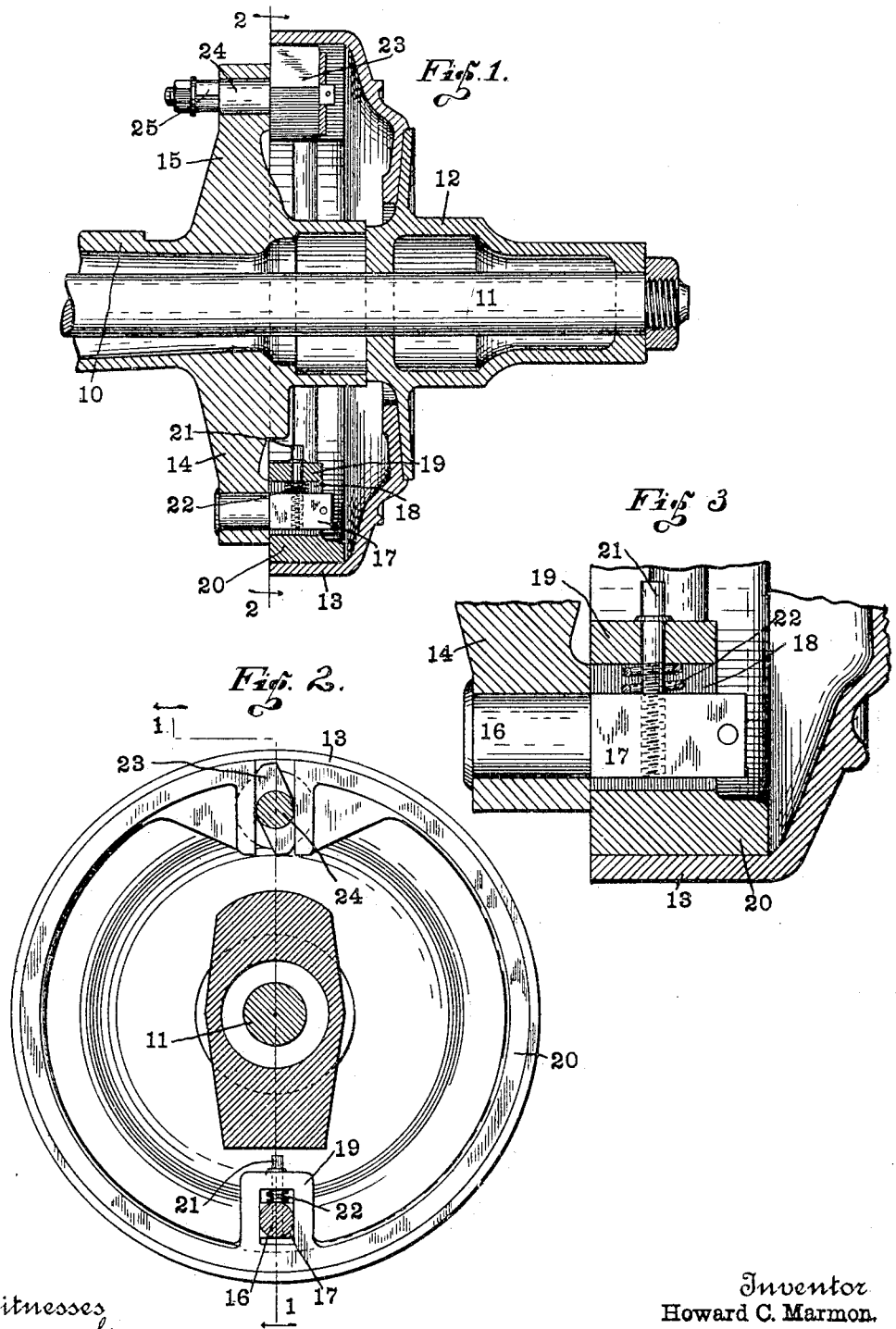

UNITED STATES PATENT OFFICE.

HOWARD C. MARMON, OF INDIANAPOLIS, INDIANA.

FRICTION-BRAKE.

SPECIFICATION forming part of Letters Patent No. 793,206, dated June 27, 1905.

Application filed June 4, 1904. Serial No. 211,112.

*To all whom it may concern:*

Be it known that I, HOWARD C. MARMON, a citizen of the United States, residing at Indianapolis, in the county of Marion and State of Indiana, have invented certain new and useful Improvements in Friction-Brakes, of which the following is a specification.

The object of my invention is to provide a friction-brake construction of internal or external ring type in which the braking pressure may be uniformly applied throughout the entire circumference.

The accompanying drawings illustrate my invention.

Figure 1 is a section on line 1 1 of Fig. 2 of an internal brake constructed in accordance with my invention; Fig. 2, a section on line 2 2 of Fig. 1, and Fig. 3 is an enlarged detail section on line 1 1 of Fig. 2.

In the drawings, 10 indicates the rear-axle structure, within which is suitably journaled the driving-axle 11, the bearings having been omitted for convenience in illustration. Secured to the outer end of axle 11 is the wheel-hub 12, which carries the brake-cup 13. Secured to or formed integral with the axle structure 10 are two oppositely-arranged arms 14 and 15. Secured to the arm 14 is a pin 16, provided at its outer end with a rectangular head 17, which projects into cup 13. Head 17 fits in a radial slot 18, formed in a lug 19, carried by the split brake-ring 20, which lies within the cup 13. Slot 18 in its radial length is considerably greater than the radial dimensions of head 17. Passing through the inner cross-bar of the lug 19 is an adjusting-screw 21, which is threaded into head 17. Arranged between the cross-bar of lug 19 and head 17, surrounding the adjusting-screw 21, is a spring 22 of a strength sufficient to support the weight of the brake-ring. It will be noticed, of course, that this is the arrangement of the spring when the pin 16 is on the lower side of the axle structure; but if for any reason it would be desirable to reverse the position of parts shown in Fig. 1 the spring 22 would then be placed between the head 17 and the main body of the brake-ring. Arranged between the adjacent ends of the brake-ring 20 is the usual spreading-cam 23, carried by a shaft 24, journaled in the arm 15. Shaft 24 carries a suitable operating-lever 25, by means of which the cam may be operated.

In the operation of the brake the action of the spreading-cam throws the tips of the two arms of the brake-ring into engagement with the brake-cup, and in the ordinary types of brakes of this kind all of the wear takes place at this point. In the present device, however, as soon as the tips of the arms of the brake-ring come into engagement with the brake-cup the whole ring is shifted radially in the cup, compressing spring 22 until all parts of the brake-ring come into contact with the brake-cup uniformly. By this construction there is therefore a uniform wear of the brake-ring at all times; but there is no frictional contact between the cup and ring except when the arms of the ring are separated.

It will be understood that a similar construction may be applied to an external braking-ring without departing from my invention.

I claim as my invention—

1. A brake consisting of an annular brake member, a coacting split-ring member, a pin-and-slot connection between said ring member and a stationary support substantially opposite the split, the slot being substantially radially to, and the pin being substantially parallel with, the axis of the annular member, the said support, a spring acting radially on said split-ring member in opposition to the weight, and means for adjusting the split-ring member relative to the annular brake member.

2. A brake consisting of an annular brake member, a coacting split-ring member having a radial slot formed therein substantially opposite the split, a stationary pin arranged substantially parallel with the axis and projecting into said slot, an adjusting-screw arranged between the pin and the split-ring member, and a supporting-spring also arranged between the split-ring member and said pin.

In witness whereof I have hereunto set my hand and seal, at Indianapolis, Indiana, this 26th day of May, A. D. 1904.

HOWARD C. MARMON. [L. S.]

Witnesses:
ARTHUR M. HOOD,
JAMES A. WALSH.

Correction in Letters Patent No. 793,206.

It is hereby certified that Letters Patent No. 793,206, granted June 27, 1905, upon the application of Howard C. Marmon, of Indianapolis, Indiana, for an improvement in "Friction-Brakes," was erroneously issued to said "Howard C. Marmon" as owner of said invention; whereas the said Letters Patent should have been issued to *Nordyke & Marmon Company, of Indianapolis. Ind., a corporation of Indiana,* as owner of the entire interest in said invention, as shown by the assignments of record in this office; and that said Letters Patent should be read with this correction therein that the same may conform to the record of the case in the Patent Office.

Signed and sealed this 18th day of July, A. D., 1905.

[SEAL.]

F. I. ALLEN,
*Commissioner of Patents.*